United States Patent
Boetto et al.

[15] 3,677,348
[45] July 18, 1972

[54] HYDRAULIC ALTERNATOR

[72] Inventors: Charles Boetto, Naperville; Wayne L. Orkwiszewski, Romeoville, both of Ill.

[73] Assignee: International Harvester Company, Chicago, Ill.

[22] Filed: March 15, 1971

[21] Appl. No.: 124,140

[52] U.S. Cl. .................................. 172/2, 172/130, 37/110
[51] Int. Cl. .................................. A01b 41/06, A01b 33/32
[58] Field of Search ............... 172/126, 127, 128, 130, 131, 172/135, 2, 204, 209; 91/413; 74/110; 37/DIG. 7; 251/58, 231

[56] References Cited

UNITED STATES PATENTS

| 3,250,333 | 5/1966 | Day .................................. 172/126 |
| 3,587,750 | 6/1971 | Cantral et al. .................. 172/130 X |

Primary Examiner—Robert E. Pulfrey
Assistant Examiner—Stephen C. Pellegrino
Attorney—Noel G. Artman

[57] ABSTRACT

An implement vertically movable between an operating and transport position including a row marker on each side of the implement that is raised and lowered by a separate hydraulic cylinder. The cylinders receive fluid from a common source through a valve that is controlled by actuating means that are responsive to vertical movement of the implement.

9 Claims, 7 Drawing Figures

Patented July 18, 1972
3,677,348
3 Sheets-Sheet 1
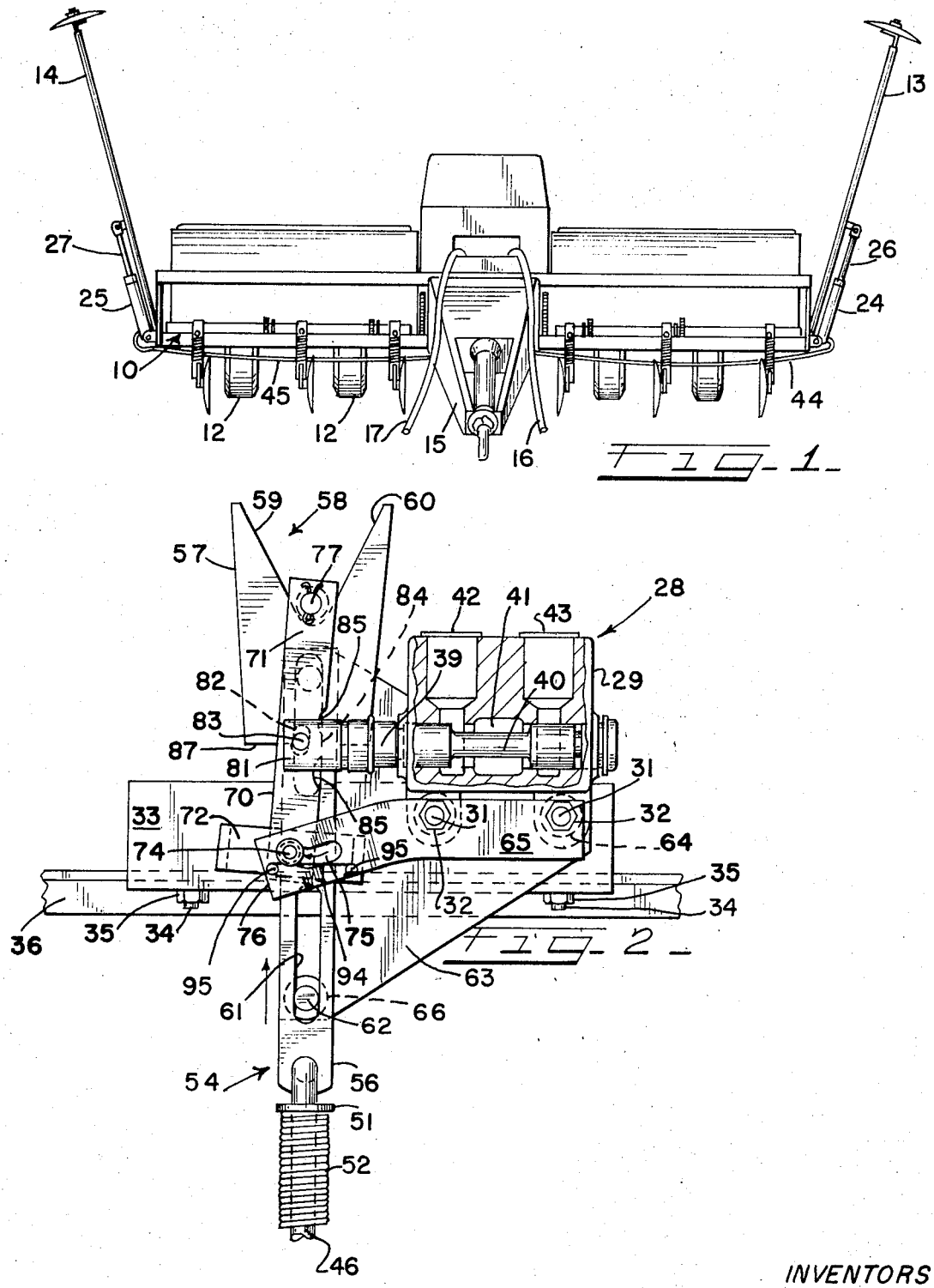
INVENTORS
CHARLES BOETTO
WAYNE L. ORKWISZEWSKI
BY
ATT'Y.

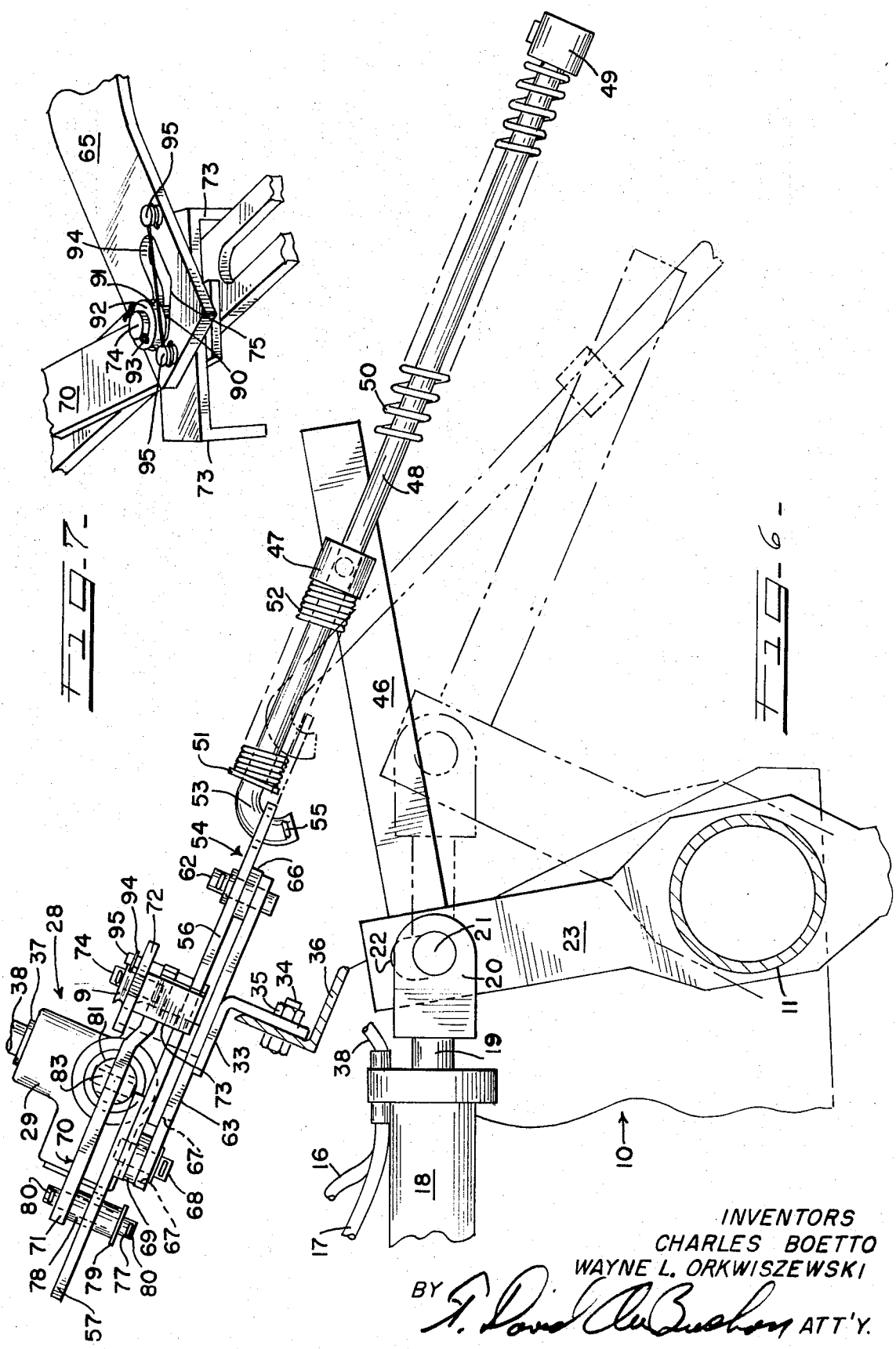

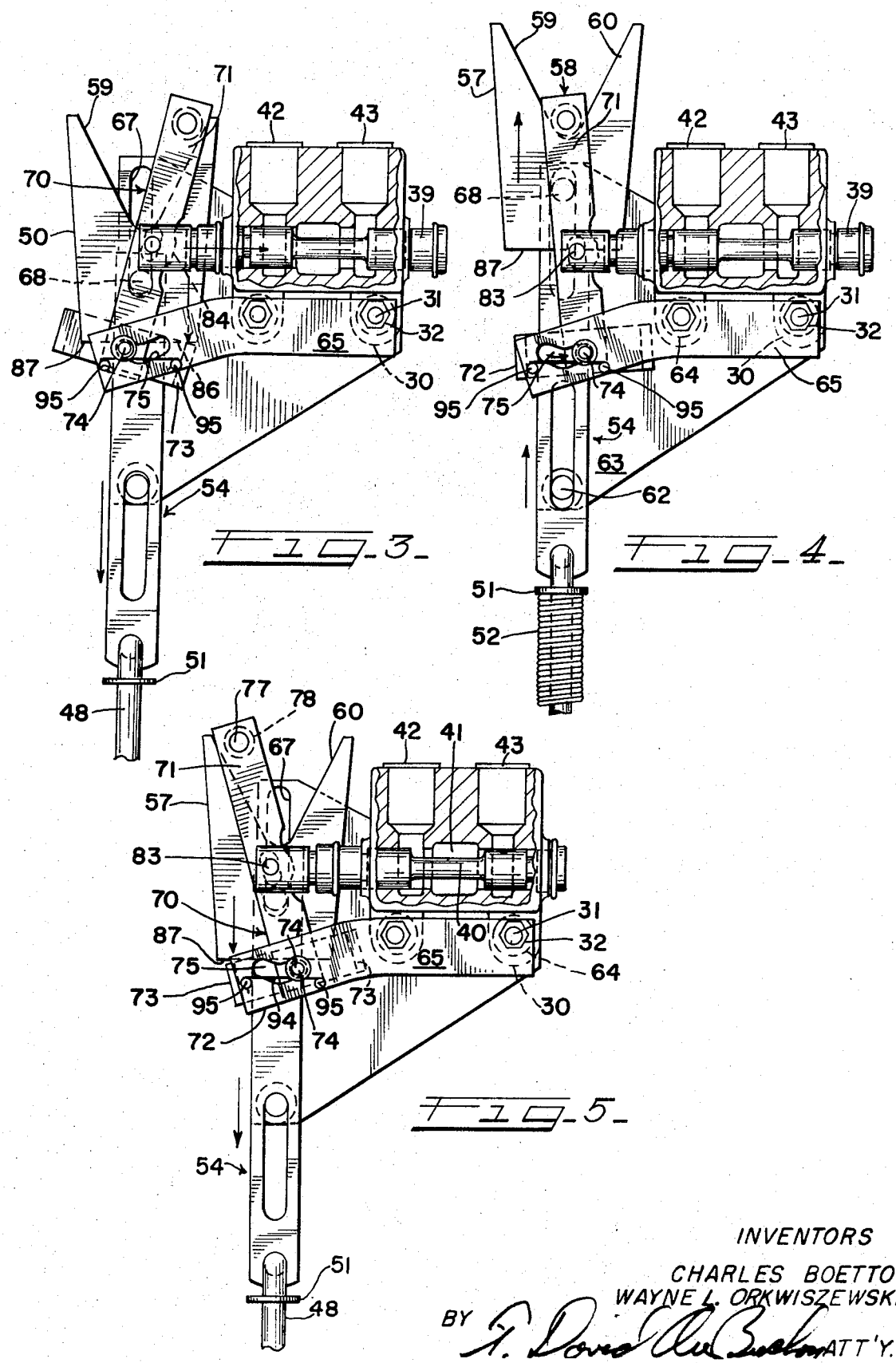

HYDRAULIC ALTERNATOR

BACKGROUND OF THE INVENTION

This invention relates to tractor propelled implements and particularly to an implement having alternately operating markers. More specifically, the invention concerns an implement such as a planter having hydraulically operated markers and means for automatically alternating the markers.

It is common practice in the agricultural industry for the operator of a tractor propelled planter or the like to traverse a field in opposite directions, raising the implement at each end of the field and again lowering the implement to traverse the field in the other direction. It is customary to mount a marker at each transverse end of the implement to form a guide furrow for the operator to follow in successive passes across the field, and to raise the operating marker when the implement is raised at the end of the field and to lower the other marker when the turn is made. In the past, the alternate raising and lowering of the markers has been performed manually and the raising of the operating marker and lowering of the other imposed a substantial burden on an operator already occupied with raising the implement and turning the tractor.

Interconnecting the markers with the implement lifting mechanism reduced the number of operations the operator must perform, and this led to the development of automatic devices actuated by the raising and lowering of the implement for alternately raising one marker and lowering the other, thus reducing the margin of error on the part of the an Such a automatically operating marker alternating mechanism is disclosed, for example, in U.S. Pat. No. 3,428,134. More recently hydraulic cylinders have been utilized for raising and lowering larger and heavier markers. An object of this invention is the provision of means for automatically alternating hydraulically operated markers.

Another object of the invention is the provision, in an implement having markers operated by hydraulic cylinders, of hydraulic fluid control means including a reversing or alternator valve for controlling the flow of fluid to and from the marker cylinders to alternately raise and lower the markers.

Another object of the invention is the provision, in an implement having markers operated by hydraulic cylinders and valve means for directing fluid to and from the markers, of improved valve actuating means responsive to the raising and lowering of the implement for reversing said valve means to direct fluid to one or the other of said marker cylinders to alternately operate the markers.

DESCRIPTION OF THE DRAWINGS

FIG. 1 is a front view of a multi-row planter adapted to be drawn by a tractor and having marker control means incorporating the features of this invention;

FIG. 2 is an enlarged detail, partly in section, showing the positions of the valve plunger and the actuating mechanism corresponding to the lowered position of the implement with one of the markers raised and the other lowered for operation;

FIG. 3 is a view similar to FIG. 2, illustrating the position of the actuating mechanism in the raised position of the implement and with the valve plunger shifted to the right;

FIG. 4 is a view of the actuating parts shown in FIG. 3 with the planter again lowered;

FIG. 5 illustrates the position of the parts with the planter again raised but with the valve plunger to the left as in FIG. 2;

FIG. 6 is an enlarged detail in side elevation, partly in section, of the means by which angular motion of the wheel shaft rock arm is converted to linear motion to operate the valve actuating mechanism shown in FIGS. 2 to 5; and FIG. 7 is an enlarged view of the forward end of the lever and its engagement with the V-shaped slot.

DESCRIPTION OF THE PREFERRED EMBODIMENT

With particular reference to FIGS. 1 and 6, the implement shown is a multi-row planter comprising a transverse frame 10 of conventional construction rockably supporting a shaft 11 upon which are mounted a plurality of wheels 12. When shaft 11 is rocked, the relative movement between the wheels and frame causes the implement to raise and lower relative to the ground.

A pair of left and right hand markers 13 and 14 are pivotally mounted at opposite transverse ends of the planter frame for alternate movement between operating and transport positions. A hitch structure 15 projects forwardly for connection to a tractor, not shown, having a suitable source of fluid under pressure including a return, a reservoir and conventional control means well known in the art for directing fluid under pressure through hose lines 16 and 17 to a double acting hydraulic cylinder 18. The hydraulic cylinder 18, in FIG. 6, is secured at one end to the planter frame and includes a piston rod 19 extensible and retractable therein. A clevis 20 at the end of rod 19 carries a pin 21 received in a slot 22 formed in the upper end of a rock arm 23 affixed to shaft 11. Shaft 11 is thus rocked by the hydraulic cylinder 18 from the solid line position of FIG. 6 corresponding to the lowered or operating position of the implement, and the dotted line position (moving the wheels 12 downwardly and raising the implement frame 10) corresponding to the transport position. Fluid from line 16 is directed to the raise side of cylinder 18 to raise the implement to the transport position and fluid from line 17 is directed to the lower side of cylinder 18 to lower the implement from the transport position to the operative position.

Fluid under pressure from the tractor source delivered through hydraulic lines 16 and 17 is also directed to a pair of left and right hand cylinders 24 and 25, pivotally mounted at opposite transverse ends of the frame 10, as indicated in FIG. 1, and having piston rods 26 and 27 slidable therein connected, respectively, to markers 13 and 14. Markers 13 and 14 are pivotally connected (not shown) to the frame 10 at one end.

Fluid from the raise side of lifting cylinder 18 is directed to single acting marker cylinders 24 or 25 to alternately raise one marker and lower the other through the intermediary of control means more fully described and shown in copending U.S. application of Donald E. Rieser, Ser. No. 119,274, filed Feb. 26, 1971. The control means include an alternator valve 28, comprising a housing 29 having a pair of ears 30, secured by bolts 31 and nuts 32 to a bracket 33. The bracket 33 being affixed by bolts 34 and nuts 35 to an angle bar 36 forming part of the planter frame 10. Alternator valve 28 has a supply port 37, indicated in FIG. 6, receiving fluid under pressure from a hose 38, connected to the raise side of cylinder 18 so that, upon extending rod 19 to raise the implement, fluid is also fed to valve 28 for alternate delivery to marker cylinders 24 and 25.

A plunger 39 slidable in alternator valve 28 has a reduced portion 40 registering with a cavity 41. Plunger 39 is shiftable in the valve housing by means, hereinafter to be described, to provide communication between supply port 37 through cavity 41 with one or the other of a pair of left and right hand marker ports 42 and 43, adapted to be connected, respectively, to conduits or hoses 44 and 45, shown in FIG. 1, for transmitting fluid to and from single acting marker cyliners 24 and 25.

As seen in FIG. 1, the planter is raised. When the planter is ready for operation and is to be propelled by the tractor over a field, it is lowered by retraction of rod 19 of the lifting cylinder 18. At the same time, the weight of one of the markers retracts the cylinder associated therewith and lowers the marker to its operating position. During this operation, hydraulic fluid from the marker cylinder flows back through hose 44 or 45, valve 28, hose 38 and line 16. Upon reaching the end of the field the implement is raised by directing fluid under pressure from the tractor source through hose line 16 to the raise side of the lifting cylinder 18 to thus extend rod 19. At the same time, the operating marker is raised. Upon turning the tractor and implement to begin operation in the opposite direction, rod 19 is again retracted to lower the implement. At the same time the marker at the other end of the planter frame is lowered.

This alternate raising and lowering of the markers with the raising and lowering of the planter is achieved by the shifting of valve plunger 39 in opposite directions in the housing 29, and this is accomplished by the valve actuating mechanism, now to be described.

As shown in FIG. 6, a rearward extension 46 is fixed, as by welding, to rock arm 23 and has mounted thereon a swivel 47 having an opening therein to slidably receive a rod 48 the rear end of which carries an adjustable collar 49. Surrounding the rod between the collar 49 and swivel 47 is a coil spring 50. Forwardly of the swivel 47 a stop 51 is fixed to the rod, confining therebetween and the swivel 47 another coil spring 52. The forward end of the rod is bent to form a hook 53 receivable in one end of a slide member generally designated 54, the end of hook portion 53 being apertured to receive a retaining cotter 55.

Slide member 54 comprises a rear portion 56 and a broadened head or yoke portion 57 in which is formed a V-shaped notch 58 having rearwardly converging sides 59 and 60 forming abutments that perform a camming function as hereinafter set forth. Slide member 54 has transversely extending shoulders 87 that define the rearward edge of yoke portion 57. An elongated slot 61 formed in member 54 slidably receives a pin 62 retained by one or more cotters or the like and carried by a triangularly shaped plate 63 mounted on bolts 31 and separated by valve housing 29 from a strap 65 also secured to bolts 31 by the nuts 32. A washer 66 spaces slide 54 from plate 63. The forward portion of plate 63 is provided with a slot 67 (FIG. 6) in which is received a pin 68 carried by slide 54. Slot 67 and pin 68 cooperate with slot 61 and pin 62 to confine the slide to linear movement in a fixed path. A washer 69 on pin 68 spaces the slide 54 from the plate 63.

At this point it should be clear that, by virtue of the connection of extension 46 through rod 48 to the slidable member 54, the latter is reciprocated by the angular movement of arm 23, in response to the extension and retraction strokes of lifting cylinder 18. Extension of rod 19 in cylinder 18 moves the rock arm to the dotted line position, of FIG. 6, and rock shaft 11 rotates clockwise to lower the wheels and raise the implement to the transport position while retraction of the rod in the cylinder lowers the implement to its operating position. As the extension of rod 19 in cylinder 18 moves rock arm 23 to the dotted line position, swivel 47 slides on rod 48 and takes up lost motion between the swivel and spring 50 to move slide 54 rearwardly, the swivel again engaging spring 52 when the implement is lowered to move slide 54 in the other direction.

In order to transmit the motion of the slide to shift valve plunger 39, an oscillatable motion transmitting member in the form of a T-shaped lever 70 is provided comprising an elongated portion 71 and a transverse base portion 72 having downturned abutment means or flanges 73 straddling the slide 54. The base portion 72 has a vertically extending pin 74 secured thereto. (See FIG. 7) A bushing 90 and a roller 91 having an annular groove formed therein are rotatably carried by pin 74. Bushing 90 and roller 91 are held on pin 74 by a washer 92 and a cotter 93. A generally V-shaped angled slot 75 is formed in the free end of strap 65 and is dimensioned to receive bushing 90. A pair of vertically extending studs 95 having grooves near their upper ends are secured to strap 65 and located such that a spring wire 94 stretched between the groove of said studs passes through the vortex of said V-shaped angled slot. Spring wire 94 is adapted to be received in the annular groove of said roller 91 and functions to bias bushing 90 to the ends of generally V-shaped angled slot 75 and also assures that bushing 90 will not come to rest in the vortex of slot 75. The forward end of lever member 70 carries a pin 77 upon which is mounted a roller or follower member 78 disposed in the V-shaped notch 58 in yoke 57 to thus establish a sliding pivotal connection therebetween. Roller 78 is confined between the rockable lever member 70 and a stop 79 on pin 77 and the pin is held against displacement by suitable cotters 80.

Medially of its ends, lever 70 is received in a clevis 81 affixed to one end of valve plunger 39, and has a slot 82 to receive a pin 83 carried by the clevis.

We may now assume, for example, that the implement and right hand marker 14 are in transport position and are to be lowered. Before lowering, valve plunger 39 and the actuating parts are in the position of FIG. 3 with port 43 open and right hand cylinder 25 extended. Slide 54 has moved to its rearward position and shoulder 87 has engaged one of the flanges 73 rotating lever 70 clockwise shifting plunger 39 to the right and opening port 43. Port 42 is closed.

The implement is lowered by actuation of the tractor hydraulic valve to relieve hydraulic pressure in line 16 and introduce hydraulic pressure to line 17. Upon relieving hydraulic pressure in line 16 hydraulic fluid from the right hand marker cylinder 25 flows through hose 45, port 43, cavity 41, port 37, hose 38, and line 16 and is thus returned to the tractor reservoir with the oil from the raise side of the lifting cylinder 18 and the right hand marker is lowered. Contracting of cylinder 18 causes slide 54 to move forwardly to the position shown in FIG. 4. The slide 54 is moving from the position shown in FIG. 3 to the position shown in FIG. 4 causes roller 78 to engage side 60 of notch 58 thus shifting pin 74 to the right hand end of slot 75 and positioning rock lever 70 in an intermediate position, without shifting plunger 39.

Upon reaching the end of the field the implement is raised by actuation of the tractor's hydraulic valve to relieve hydraulic pressure in line 17 and introduce hydraulic pressure in line 16 and thereby line 38. Oil from the raise side of the lifting cylinder 18 passes through port 43 to marker cylinder 25 to raise the right and marker. Raising the implement resulted in movement of slide 54 rearwardly causing shoulder 87 of yoke 57 to engage one of the flanges 73 and rock lever member 70 to the position of FIG. 5, shifting plunger 39 to the left, closing port 43 and opening port 42.

The tractor is then turned around and the implement lowered. Upon lowering the implement, oil from the left hand marker cylinder is returned to the tractor reservoir through hose 44, port 42, cavity 41, port 37, hose 38 and hose line 16 along with the oil from the raise side of the lifting cylinder, thus lowering the left hand marker. Lowering the implement causes slide 54 to move forward to the position of FIG. 2, side 59 of notch 58 engaging and exerting a camming action on roller 78, forcing pin 74 to the left hand end of slot 75 and rocking lever member 70 to an intermediate position without shifting plunger 39.

From the foregoing it should be clear that simple and efficient actuating means have been provided, responsive to the raising and lowering of the implement for reversing an alternator valve plunger for controlling the flow of fluid to and from hydraulic cylinders for alternately operating a pair of markers or the like.

What is claimed is:

1. In an implement having a frame, a pair of alternately operable members mounted on the frame and hydraulic cylinders mounted on the frame operatively connected to said members; valve means fixedly mounted relative to said frame and having a pair of ports, conduit means connecting each port to one of said hydraulic cylinders, a plunger shiftable in the valve means, and means for shifting said plunger to open one of said ports and close the other to direct fluid to or from one or the other of said cylinders to alternately operate said members comprising: a lever pivotally mounted medially of its ends on said plunger, a slide member mounted to slide in a fixed path relative to said frame, means establishing a sliding pivotal connection between one end of said lever and said slide member, abutment means on said lever for engagement with said slide member when said slide member is reciprocated in both directions, said abutment means including a first abutment means at the one end of said lever extending into the plane of said slide member, said first abutment means engaged by said slide member when the latter is moved in one direction to rock the lever about its sliding pivotal connection and thereby shift said plunger.

2. The invention set forth in claim 1, wherein said abutment means includes second abutment means on said slide member at its sliding pivotal connection end, a follower member carried by said lever at said one end arranged to engage said second abutment means upon movement of said slide member in the other direction, to shift said lever about its pivotal mounting on said plunger.

3. The invention set forth in claim 2, wherein said second abutment means is a cam face on the slide member engageable with said one end of said lever to move the latter laterally of the path of said slidable member.

4. The invention set forth in claim 3, wherein a V-shaped slot is provided in the frame, and said pivot means is a pin receivable in said slot and a pin carried by the other end of said lever adapted to be received in and shiftable along said V-shaped slot upon engagement of said cam face with said one end of said lever.

5. The invention set forth in claim 1, wherein a part is movably mounted on the frame for raising and lowering the implement, and is operatively connected to said slide member to move the latter in opposite directions in response to the raising and lowering of the frame.

6. The invention set forth in claim 2, wherein a part is movably mounted on the frame for raising and lowering the implement, and is operatively connected to said slide member to move the latter in opposite directions in response to the raising and lowering of the frame.

7. The invention set forth in claim 3, wherein a part is movably mounted on the frame for raising and lowering the implement, and is operatively connected to said slide member to move the latter in opposite directions in response to the raising and lowering of the frame.

8. The invention set forth in claim 4, wherein a part is movably mounted on the frame for raising and lowering the implement, and is operatively connected to said slide member to move the latter in opposite directions in response to the raising and lowering of the frame.

9. The invention as set forth in claim 5, wherein a spring means anchored on said frame creates a bias on said pin urging said pin towards the ends of said V-shaped groove.

* * * * *